(12) United States Patent
Alexandridis

(10) Patent No.: US 7,665,585 B2
(45) Date of Patent: Feb. 23, 2010

(54) VEHICLE SUSPENSION SYSTEM AND METHOD FOR OPERATING

(76) Inventor: Alexander A. Alexandridis, 4529 W. Cherry Hill Dr., Orchard Lake Village, MI (US) 48323

( * ) Notice: Subject to any disclaimer, the term of this patent is extended or adjusted under 35 U.S.C. 154(b) by 527 days.

(21) Appl. No.: 11/212,017

(22) Filed: Aug. 25, 2005

(65) Prior Publication Data

US 2006/0060750 A1    Mar. 23, 2006

Related U.S. Application Data

(60) Provisional application No. 60/607,328, filed on Sep. 3, 2004.

(51) Int. Cl.
*F16F 15/03* (2006.01)
(52) U.S. Cl. .................. 188/280; 248/562; 267/220
(58) Field of Classification Search .......... 188/266.1, 188/267, 380, 280; 280/5.507; 701/37, 38; 248/562; 267/220
See application file for complete search history.

(56) References Cited

U.S. PATENT DOCUMENTS

| | | | |
|---|---|---|---|
| 3,689,103 A * | 9/1972 | Meulendyk | 280/5.513 |
| 3,807,678 A * | 4/1974 | Karnopp et al. | 248/562 |
| 3,947,004 A * | 3/1976 | Taylor | 267/64.13 |
| 4,634,142 A * | 1/1987 | Woods et al. | 280/5.503 |
| 4,921,272 A * | 5/1990 | Ivers | 188/280 |
| 5,296,785 A * | 3/1994 | Miller | 318/254.1 |
| 5,497,324 A * | 3/1996 | Henry et al. | 701/37 |
| 5,732,370 A * | 3/1998 | Boyle et al. | 701/37 |
| 6,010,139 A | 1/2000 | Heyring et al. | |
| 6,032,770 A | 3/2000 | Alcone et al. | |
| 6,164,665 A * | 12/2000 | Lentz et al. | 280/5.503 |
| 6,259,982 B1 * | 7/2001 | Williams et al. | 701/38 |
| 6,519,517 B1 | 2/2003 | Heyring et al. | |
| 6,669,208 B1 | 12/2003 | Monk et al. | |
| 6,669,216 B1 | 12/2003 | Elser et al. | |
| 6,732,033 B2 | 5/2004 | LaPlante et al. | |
| 6,761,371 B1 | 7/2004 | Heyring et al. | |
| 6,817,597 B1 | 11/2004 | Thurow et al. | |
| 6,834,865 B1 | 12/2004 | Lin | |
| 6,904,344 B2 | 6/2005 | LaPlante et al. | |
| 2002/0096841 A1 * | 7/2002 | Hedenberg | 280/6.159 |
| 2003/0155194 A1 | 8/2003 | Kienholz | |

(Continued)

OTHER PUBLICATIONS

ABC Module, ZF Zachs, Driveline and Chassis Technology, ZF Friedrichshafen AG http://www.zfsachs.com/owx_7_30913_2_6_0_00000000000000.html?link=owx_7_3091.

*Primary Examiner*—Christopher P Schwartz
(74) *Attorney, Agent, or Firm*—Dickinson Wright PLLC; William H. Honaker

(57) ABSTRACT

A vehicle suspension system includes a mechanical spring portion adapted to undergo suspension deflection, a spring seat contacting and supporting the mechanical spring portion, and a mechanical gear assembly which is operatively connected to the spring seat to control spring seat position and which is adapted to be driven by an electric motor. A method for operating a vehicle suspension system undergoing suspension deflection, wherein the vehicle suspension system includes a mechanical spring portion having a spring seat with a movable spring seat position, includes determining a frequency content of the suspension deflection. The method also includes electromechanically controlling the spring seat position in response to suspension deflection when the determined frequency content is in a low-frequency range below a wheel hop frequency.

20 Claims, 1 Drawing Sheet

U.S. PATENT DOCUMENTS

| | | |
|---|---|---|
| 2004/0099783 A1 | 5/2004 | Kienholz |
| 2004/0099784 A1 | 5/2004 | Kienholz |
| 2004/0150361 A1* | 8/2004 | Hio et al. .................... 318/375 |
| 2004/0215380 A1* | 10/2004 | Song ........................... 701/37 |
| 2005/0085970 A1 | 4/2005 | Song et al. |
| 2005/0110226 A1* | 5/2005 | Sasada ....................... 280/5.5 |
| 2005/0206099 A1* | 9/2005 | Song ....................... 280/5.507 |
| 2005/0230201 A1* | 10/2005 | Kondou et al. .............. 188/267 |

* cited by examiner

VEHICLE SUSPENSION SYSTEM AND METHOD FOR OPERATING

CROSS REFERENCE TO RELATED APPLICATIONS

The present application claims priority of U.S. Provisional Application No. 60/607,328 filed Sep. 3, 2004.

TECHNICAL FIELD

The present invention relates generally to vehicle suspension systems, and more particularly to a vehicle suspension system having a mechanical spring portion and to a method for operating a vehicle suspension system having a mechanical spring portion.

BACKGROUND OF THE INVENTION

Known vehicle suspension systems include an active body control system (ABC Module) having a damping portion and having a mechanical spring portion. The damping portion includes a damping cylinder and a damping valve of fixed damping characteristics. The position of the spring seat of the mechanical spring portion is hydraulically controlled only at low frequencies below the wheel hop frequency using a hydraulically actuated plunger, a proportional valve, an accumulator, and a pump.

What is needed is an improved vehicle suspension system having a mechanical spring portion and an improved method for operating a vehicle suspension system having a mechanical spring portion.

SUMMARY OF THE INVENTION

A method of the invention is for operating a vehicle suspension system undergoing suspension deflection, wherein the vehicle suspension system includes a damping portion and includes a mechanical spring portion having a spring seat with a movable spring seat position. The method includes determining a frequency content of the suspension deflection. The method also includes electromechanically controlling, without using fluid pressure, the spring seat position in response to suspension deflection when the determined frequency content is in a low-frequency range below a wheel hop frequency. The method also includes not controlling the spring seat position in response to suspension deflection when the determined frequency content is above the low-frequency range.

A first expression of an embodiment of the invention is for a vehicle suspension system including a vehicle-suspension-system mechanical spring portion, a spring seat, and a mechanical gear assembly. The mechanical spring portion is adapted to undergo suspension deflection. The spring seat contacts and supports the mechanical spring portion. The mechanical gear assembly is operatively connected to the spring seat to control spring seat position and is adapted to be driven by an electric motor.

A second expression of an embodiment of the invention is for a vehicle suspension system including a vehicle-suspension-system mechanical spring portion, a spring seat, and a screw and ball nut assembly. The mechanical spring portion is adapted to undergo suspension deflection. The spring seat contacts and supports the mechanical spring portion. The screw and ball nut assembly is operatively connected to the spring seat to control spring seat position and is adapted to be driven by an electric motor.

Several benefits and advantages are derived from one or more of the method and expressions of an embodiment of the invention. In one example, controlling the spring seat position using a mechanical gear assembly adapted to be driven by an electric motor eliminates conventional hydraulic/pneumatic power sources, hoses, filters, etc. and provides easier packaging and integration into the vehicle.

DETAILED DESCRIPTION

Figure 1:
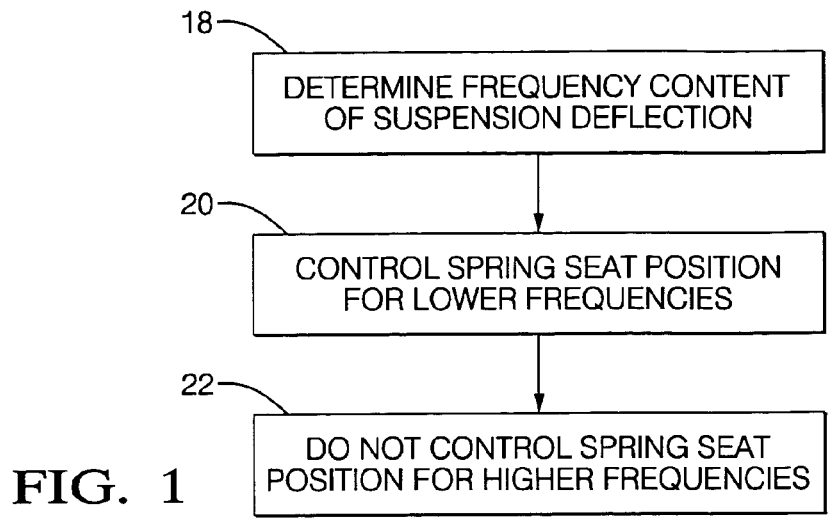
FIG. 1 is a block diagram of a method of the invention.
Figure 2:
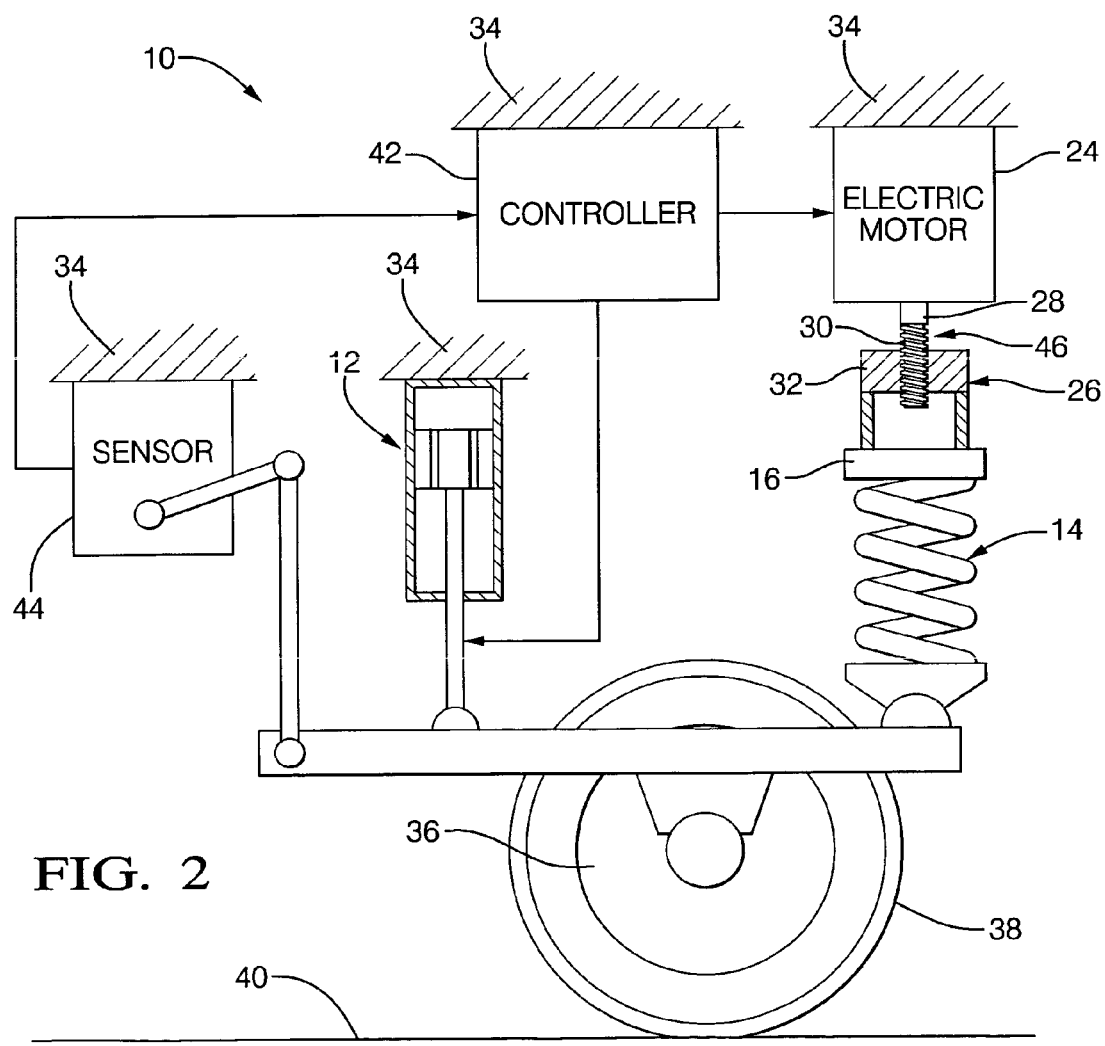
FIG. 2 is a schematic diagram of an embodiment of a vehicle suspension system of the invention.

Referring now to the FIGS. 1 and 2 of the drawings, a method of the invention for operating a vehicle suspension system 10 undergoing suspension deflection, wherein the vehicle suspension system 10 includes a damping portion and includes a mechanical spring portion 14 having a spring seat 16 with a movable spring seat position. It is noted that an embodiment of an active damping portion 12 and of a spring seat 16 is shown schematically in FIG. 2. The method includes steps a) through c). Step a), as indicated generally by block 18 of FIG. 1, includes determining a frequency content of the suspension deflection. Step b), as indicated generally by block 20 of FIG. 1, includes electromechanically controlling (i.e., varying), without using fluid pressure, the spring seat position in response to suspension deflection when the determined frequency content is in a low-frequency range below a wheel hop frequency. Step c), as indicated generally by block 22 of FIG. 1, includes not controlling (i.e., not varying) the spring seat position in response to suspension deflection when the determined frequency content is above the low-frequency range.

Determining a frequency content of the suspension deflection is within the ordinary level of skill of the artisan. In one embodiment of the method, the frequency content is obtained using the output of an accelerometer mounted to the vehicle body/frame which measures the vertical (i.e., in a direction substantially perpendicular to the road surface) acceleration of the body/frame. It is noted that the body/frame will react only to low-frequency body events and not to high-frequency wheel events. An example of a body event is when the body of the vehicle moves (pitches, heaves, or rolls) in response to vertical road inputs or driver steering or braking inputs. An example of a wheel event is a wheel hop occurring when a wheel passes in and out of a disturbance in the road. In a different embodiment of the method, the frequency content is obtained using the output of a relative displacement sensor (such as a Delphi Hall Effect Rotary Displacement Sensor) or relative velocity sensor which measures the vertical displacement or vertical velocity of the wheel relative to the body/frame. A technique for differentiating between wheel and body events is disclosed in U.S. patent application Ser. No. 11/086,109 filed Mar. 22, 2005, the entire content of which is herein incorporated by reference.

It is noted that changing the spring seat position effectively changes the spring stiffness of the mechanical spring portion 14. It is also noted that algorithms for controlling the spring seat position in response to suspension deflection when the determined frequency content is in a low-frequency range below a wheel hop frequency, to achieve a desired balance between ride quality and road isolation on the one hand and body control during handling maneuvers on the other hand, are within the ordinary level of skill of the artisan.

In one implementation of the method, step b) uses an electric motor 24 operatively connected to a mechanical gear assembly 26 to control the spring seat position. In one variation, the electric motor 24 includes a rotatable output shaft 28 and the mechanical gear assembly 26 includes a screw 30 and a ball nut 32. In one modification, designs of a screw and a ball nut of a conventional vehicle electromechanical brake caliper are adapted, with appropriate sizing of parts, to serve as a design for the screw 30 and the ball nut 32 of the mechanical gear assembly 26. Other variations of mechanical gear assemblies are left to those skilled in the art. In a different implementation, not shown, step b) uses an electric linear motor whose linearly movable output shaft is attached to the spring seat. Other implementations are left to the artisan.

In one application of the method, the wheel hop frequency is in the range between substantially 10 and substantially 16 Hertz. In one variation, the low-frequency range has an upper limit of substantially 6 Hertz.

In one enablement of the method, not shown, the damping portion is a passive damping portion. Examples of passive dampers are left to the artisan. In a different enablement, the damping portion is an active damping portion 12 having controllable damping. In one extension of the method, there is also included the step of controlling the damping of the active damping portion 12. In one example, the active damping portion 12 includes a magnetorheological damper. In a different example, not shown, the active damping portion includes a valve-based hydraulic damper. It is noted that in these enablements the damping portion and the mechanical spring portion 14 are disposed in parallel between the vehicle body/frame 34 (indicated by "/////" in FIG. 2) and the vehicle wheel 36, wherein the vehicle wheel 36 supports a tire 38 which is supported by the road surface 40.

An embodiment of a vehicle suspension system 10 is shown schematically in FIG. 2. A first expression of the embodiment of FIG. 2 is for a vehicle suspension system 10 including a vehicle-suspension-system mechanical spring portion 14, a spring seat 16, and a mechanical gear assembly 26. The mechanical spring portion 14 is adapted to undergo suspension deflection. The spring seat 16 contacts and supports the mechanical spring portion 14. The mechanical gear assembly 26 is operatively connected to the spring seat 16 to control (i.e., vary) spring seat position and is adapted to be driven by an electric motor 24.

In one implementation of the first expression of the embodiment of FIG. 2, the vehicle suspension system 10 also includes the electric motor 24. In one variation, the vehicle suspension system 10 also includes a controller 42 having an output connected to the electric motor 24. In one modification, the vehicle suspension system 10 also includes a sensor 44 adapted to sense the suspension deflection (e.g., the vertical displacement and/or vertical velocity of the wheel 36 relative to the body/frame 34) and having an output connected to the controller 42. In one example, the controller 42 determines a frequency content of the suspension deflection using at least the output of the sensor 44, and the controller 42 controls the spring seat position in response to suspension deflection only when the determined frequency content is in a low-frequency range below a wheel hop frequency. It is noted that the controller 42 may be a single unit or may include two or more interconnected units, not shown (such as a first unit to determine the frequency content of the suspension deflection and a second unit to control the spring seat position by controlling the electric motor).

In one extension of the first expression of the embodiment of FIG. 2, the vehicle suspension system 10 also includes an active damping portion 12, wherein the controller 42 has an additional output connected to the active damping portion 12. In one variation, the active damping portion 12 is a magnetorheological damper. In a different variation, not shown, the active damping portion includes a valve-based hydraulic damper.

It is noted that algorithms for controlling the active damping portion 12 in response to suspension deflection, to achieve a desired balance between ride quality and road isolation on the one hand and body control during handling maneuvers on the other hand, are within the ordinary level of skill of the artisan.

A second expression of the embodiment of FIG. 2 is for a vehicle suspension system 10 including a vehicle-suspension-system mechanical spring portion 14, a spring seat 16, and a screw and ball nut assembly 46. The mechanical spring portion 14 is adapted to undergo suspension deflection. The spring seat 16 contacts and supports the mechanical spring portion 14. The screw and ball nut assembly 46 is operatively connected to the spring seat 16 to control (i.e., vary) spring seat position and is adapted to be driven by an electric motor 24.

It is noted that the implementations, variations, etc. of the previously-described first expression of the embodiment of FIG. 2 are equally applicable to the second expression of the embodiment of FIG. 2.

In one example of the first and/or second expressions of the embodiment of FIG. 2, the sizing of the mechanical spring portion 14 (stiffness) is based on energy (and power) considerations as well as bandwidth capabilities of the electric motor 24 and the mechanical gear assembly 26. In one variation, selection of a softer (than conventional stiffness) mechanical spring portion 14 would require the use of energy for body control (e.g., during maneuvering), but would also lower the body frequencies and provide better ride quality (in conjunction with damping force control). In a different variation, selection of a higher stiffness (than conventional stiffness) mechanical spring portion 14 would require active softening of the spring force (lowering the energy requirements) and would also provide a means for damping control through the spring forces (powered damping). In one application of each variation, the dynamic response of controlling the spring seat position is limited (upper limit) to about 5-6 Hertz. In one arrangement, the screw of the screw and ball nut assembly 38 is not subjected to high-frequency, road-induced vibrations which should reduce noise and increase durability.

Several benefits and advantages are derived from one or more of the method and expressions of an embodiment of the invention. In one example, controlling the spring seat position using a mechanical gear assembly adapted to be driven by an electric motor eliminates conventional hydraulic/pneumatic power sources, hoses, filters, etc. and provides easier packaging and integration into the vehicle.

The foregoing description of a method and several expressions of an embodiment of the invention has been presented for purposes of illustration. It is not intended to be exhaustive or to limit the invention to the precise steps and forms disclosed, and obviously many modifications and variations are possible in light of the above teaching. It is intended that the scope of the invention be defined by the claims appended hereto.

The invention claimed is:

1. A method for operating a vehicle suspension system extending between a frame and a wheel of a vehicle wherein the vehicle suspension system comprises a suspension assembly that includes a first spring seat for movement with the wheel and a second spring seat for movement relative to the frame of the vehicle and a spring having a spring stiffness and extending between the first spring seat and the second spring seat for elastically deflecting in response to movement of the wheel relative to the frame, and said suspension assembly further includes an actuator that engages the frame and is configured to displace the second spring seat relative to the frame of the vehicle, wherein the method comprises the steps of:

measuring a frequency of a suspension deflection of said frame in relation to the spring utilizing a frequency sensor;

analyzing if the frequency is below a predetermined frequency using a controller;

controlling the actuator by the controller when the frequency is below a predetermined frequency;

moving the second spring seat by the actuator relative to the frame of the vehicle in response to the frequency being below a predetermined frequency to control the stiffness of the spring to minimize movement of the frame of the vehicle.

2. The method as set forth in claim 1 further including the step of damping movement between the wheel and the frame of the vehicle with a damper secured between the frame and the wheel.

3. The method as set forth in claim 2 wherein the damper is further defined as an active damper.

4. The method as set forth in claim 3 further including the step of controlling the damping of the active damper by the controller.

5. The method as set forth in claim 4, wherein the active damper is operative when the frequency is below the predetermined frequency.

6. The method as set forth in claim 3 wherein the active damper is a magnetorheological damper.

7. The method as set forth in claim 3 wherein the damper is a valve-based hydraulic damper.

8. The method as set forth in claim 1 wherein the step of moving the second spring seat relative to the frame of the vehicle is further defined as moving the second spring seat relative to the frame of the vehicle, wherein the actuator is an electric motor.

9. The method as set forth in claim 1 wherein said step of moving the second spring seat relative to the frame of the vehicle with the electric motor is further defined as moving the second spring seat relative to the frame of the vehicle with an electric motor in connection with a mechanical gear assembly, and said mechanical gear assembly includes a screw and a ball nut and the screw includes a first screw portion and a second portion, and the first screw portion is in mechanical connection with the electric motor and the second screw portion is threaded into the ball nut, and the controller controls the electric motor to turn the screw that displaces the ball nut against the second spring seat controlling the stiffness of said spring when the frequency is below the predetermined frequency.

10. The method as set forth in claim 1 wherein the predetermined frequency is about 10 Hertz.

11. A suspension system for extending between a frame and a wheel of a vehicle comprising:

a suspension assembly for deflecting and insulating movement of the wheel relative to the frame, said suspension assembly including a first spring seat for movement with the wheel and a second spring seat for movement relative to the frame of the vehicle, and including a spring having a spring stiffness and extending between said first spring seat and second spring seat for elastically deflecting in response to movement of the wheel relative to the frame, said suspension assembly further includes an actuator that engages the frame and is configured to displace the second spring seat relative to the frame of the vehicle;

a frequency sensor for measuring a frequency of a suspension deflection of said frame in relation to the spring; and a controller having electrical connection with the actuator and the frequency sensor;

wherein the frequency sensor measures the frequency and the controller operates the actuator displacing the second spring seat in response to said frequency being below a predetermined frequency to control said stiffness of said spring to minimize movement of the frame of the vehicle.

12. The suspension system as set forth in claim 11 further comprising a damper for extending between the frame and the wheel of the vehicle for dissipating energy from movement between the wheel and the frame of the vehicle.

13. The suspension system as set forth in claim 12 wherein the damper comprises an active damper and said active damper is at least one of:
(i) a valve-based hydraulic damper; and
(ii) a magnetorheological damper.

14. The suspension system as set forth in claim 13 wherein the controller is in electrical communication with the active damper and includes an electrical output to the active damper to control the active damper when the frequency is below the predetermined frequency.

15. The suspension system as set forth in claim 11 wherein said actuator comprises an electric motor secured to the frame and in mechanical connection with a mechanical gear assembly, said mechanical gear assembly includes a screw and a ball nut and the screw includes a first screw portion and a second portion, and the first screw portion is in mechanical connection with the electric motor and the second screw portion is threaded into the ball nut, and the controller controls the electric motor to turn the screw that displaces the ball nut against the second spring seat controlling the stiffness of said spring when the frequency is below the predetermined freciuency.

16. The suspension system as set forth in claim 15 wherein the a controller having an input in electrical communication with said sensor for receiving and processing said frequency and having an output in electrical communication with said electric motor.

17. The suspension system as set forth in claim 11 wherein said predetermined frequency is about 10 Hertz.

18. The suspension system as set forth in claim 11 wherein the frequency sensor comprises at least one of:
(i) an accelerometer to measure vertical acceleration of the frame; and
(ii) a relative displacement sensor to measure at least one of:
(a) a vertical displacement of the wheel relative to the frame; and
(b) a vertical velocity of the wheel relative to the frame.

19. The wheel suspension system of claim 11, wherein the suspension system comprises two or more separate controllers, and a first controller determines the frequency and a second controller controls the electric motor.

20. The suspension system of claim 11, wherein the controller reads the frequency from the sensor and compares the frequency against the predetermined frequency.

* * * * *

UNITED STATES PATENT AND TRADEMARK OFFICE
CERTIFICATE OF CORRECTION

PATENT NO. : 7,665,585 B2
APPLICATION NO. : 11/212017
DATED : February 23, 2010
INVENTOR(S) : Alexander A. Alexandridis Page 1 of 1

It is certified that error appears in the above-identified patent and that said Letters Patent is hereby corrected as shown below:

Column 3, line 61: "first u nit" should read "first unit";
Column 6, line 40: "freciuency" should read "frequency";
Column 6, line 42: "the a controller" should read "the controller"; and
Column 6, line 44: "haying" should read "having".

Signed and Sealed this

Eleventh Day of May, 2010

David J. Kappos
*Director of the United States Patent and Trademark Office*